Figure 4:
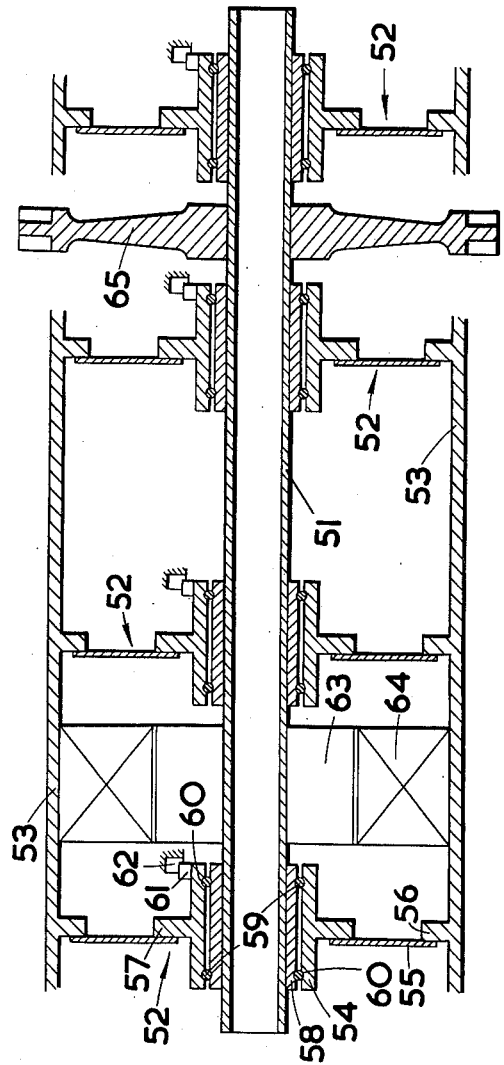

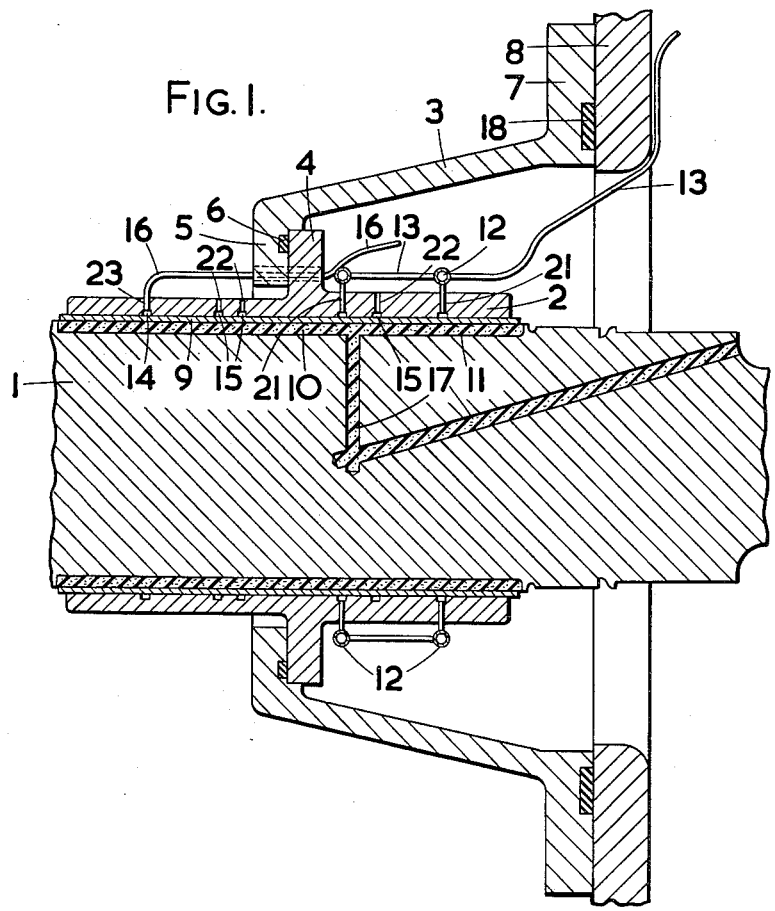

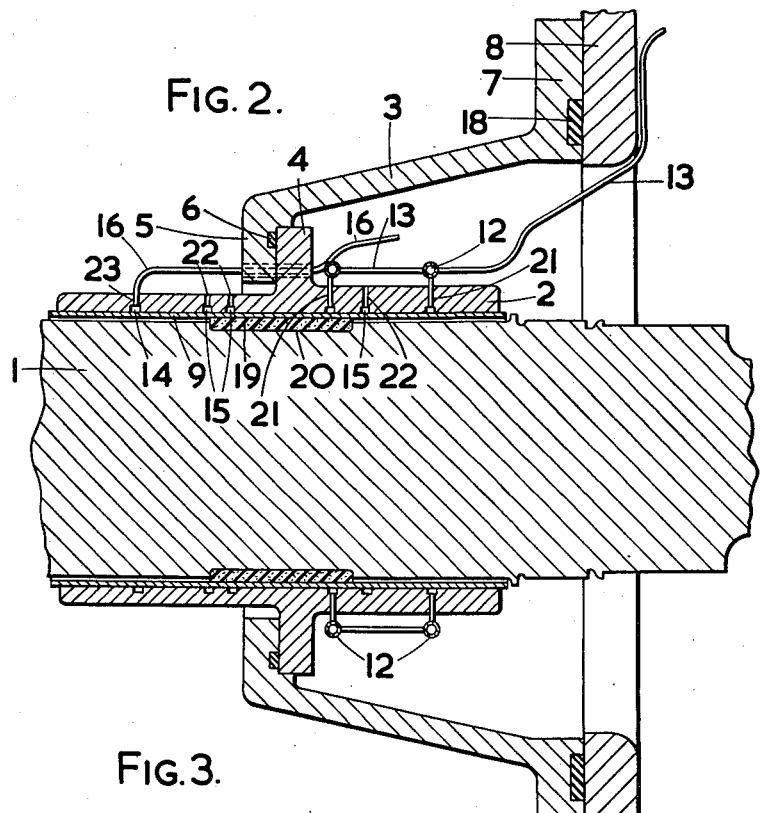
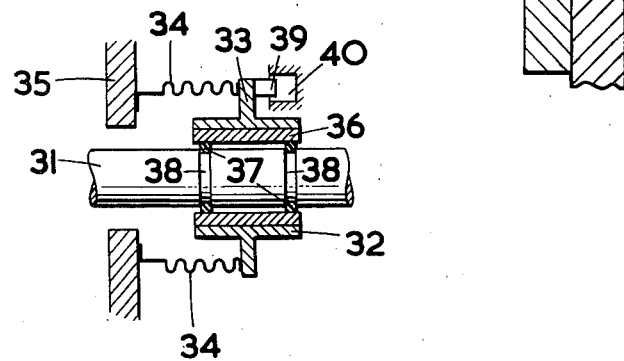

United States Patent Office 3,034,837
Patented May 15, 1962

3,034,837
GAS LUBRICATED JOURNAL BEARING ASSEMBLIES
Allan Barker, Saughall, near Chester, England, assignor to United Kingdom Atomic Energy Authority, London, England
Filed May 17, 1960, Ser. No. 29,599
Claims priority, application Great Britain May 22, 1959
4 Claims. (Cl. 308—9)

This invention relates to gas lubricated journal bearing assemblies.

The use of gas lubricated journal bearing assemblies involves maintaining very small clearances between the relatively rotating parts and it is the practice to support the journal bearing part in bellows or flexible diaphragms so that the journal bearing part is capable of following slight relative deflections of the journal part without causing rubbing.

Bellows are used where the journal bearing part carries no substantial weight, such as a sleeve on a shaft, the sleeve being sealed by the bellows to a casing into which the shaft passes and the sleeve forming a gland for the shaft but not carrying the weight of the shaft. Diaphragms are used where a substantial weight has to be carried as they have a good transverse stiffness. However problems can arise with the use of both bellows and diaphragms. For example, seizure of a bearing supported by bellows or a diaphragm acting as a seal can create a large and possibly dangerous breach in the sealing arrangements. Further, diaphragms are not suitable for supporting a line of more than two conventional gas lubricated journal bearings carrying a single shaft as their transverse stiffness demands that a very high degree of accuracy exists in alignment.

The present invention resides in a gas lubricated journal bearing assembly having a journal member and a journal bearing member, one of the members of the assembly comprising a base part having a coaxial sleeve part joined to it by an annular sealing part, the arrangement being such that in normal operation gas lubrication can be sustained between the sleeve part and the other member of the assembly and in the event of bearing seizure relative rotation between the sleeve part and its base part can take place by slip at the annular sealing part.

Use of a gas lubricated journal bearing assembly according to the invention as a gland has the advantage that in the event of gas lubrication failure, slip can take place at the annular sealing part without creating a large leakage path through the gland.

By way of example, the invention will now be described with reference to the accompanying drawings wherein FIGS. 1 and 2 are sectional elevations, and FIGS. 3 and 4 are diagrammatic sectional elevations.

Referring to FIG. 1, a gas lubricated journal bearing assembly comprises a journal member in the form of rotatable shaft 1 and a journal bearing member in the form of a sleeve 2 round the shaft 1 and constrained against rotation by a mounting ring 3. The sleeve 2 has a flange 4 secured to a flange 5 on the ring 3 by bolts (not shown), a sealing ring 6 being provided. The ring 3 has a flange 7 secured to a casing 8 by bolts (not shown), a sealing ring 18 being provided. The shaft 1 projects through the casing 8 and the shaft 1 forms a base part to which a coaxial sleeve part 9 is joined by an annular sealing part in the form of a flexible sealing band 10 between the shaft 1 and the sleeve part 9. The band 10 is in the form of a rubber latex sleeve located in a groove 11 in the shaft 1 and bonded to the shaft 1 and to the sleeve part 9. Pipes 12, of ring form, having jets 21 and a feed pipe 13 leading from the outside of the casing 8 are provided for feeding gas to the assembly to provide gas lubrication between the sleeve 2 and the sleeve part 9. The sleeve 2 has a groove 14, with a communicating passageway 23, and grooves 15 with communicating passageways 22. A pipe 16 leads from the outside of the casing 8 to the passageway 23. The shaft 1 has a passageway 17.

In FIG. 2, parts similar to those in FIG. 1 are denoted by the same reference numerals. The shaft 1 has a flexible sealing band 19 between the shaft 1 and the sleeve part 9. The band 19 is in the form of a moulded rubber sleeve located in a groove 20 in the shaft 1.

The sleeve part 9 is assembled on the shaft 1 prior to introduction of the shaft 1 into the casing 8. For the arrangement shown in FIG. 1, the sleeve part 9 is first accurately located on the shaft 1 by split collets. Rubber latex is then injected under pressure through the passageway 17 to fill the groove 11 and is then cured to form the band 10 and the collets are then removed. For the arrangement shown in FIG. 2, the band 19 is first brought into position from one end of the shaft 1 and the sleeve part 9 is then positioned on the band 19.

The size and bearing surface finish of the sleeve 2 and the sleeve part 9 are such as to maintain gas lubrication, e.g. the diametral clearance is 0.001 inch for a diameter of two inches.

The assemblies described above have one application in the pumping of reactive or toxic gases. The reactive of toxic gas is contained in the casing 8. The shaft 1 is motor driven from outside the casing 8 and the end of the shaft 1 inside the casing 8 has an impeller mounted on it. Lubricating gas is fed to the assembly along feed pipe 13, pipes 12 and the jets 21, to provide gas lubrication between the sleeve part 9 and the sleeve 2. Sealing gas is fed along the pipe 16, the passageway 23 and the groove 14 to provide an inflow of sealing gas into the casing 8 thereby preventing an outflow of the reactive or toxic gas. The passageways 22 of the grooves 15 are open to provide pressure control in the space between the sleeve part 9 and sleeve 2. The band 10 (or the band 19 permits slight relative deflection between the shaft 1 and the sleeve 2.

Should gas lubrication fail resulting in the sleeve 2 and the sleeve part 9 seizing together, relative rotation between the sleeve part 9 and the shaft 1 takes place by slip at the band 10 (or the band 19) without creating a large leakage path at the band, and without causing damage to the shaft necessitating its removal from the compressor and remachining or replacement. The increased torque, consequent upon seizure, can be utilised to operate an alarm.

The band 10 may be in the form of separate O-section sealing rings at each end of the sleeve 9.

The ring 3 may be replaced by a bellows, the bellows being sealed at one end to the casing 8 and at the other end to the flange 4 and being strengthened against torque causing its rupture by the provision of rotary stops, so that in the event of failure of gas lubrication, a small rotary deflection is applied to the bellows to bring it against the stops and then relative rotation between the sleeve part and the base part takes place by slip at the annular sealing part. The rotary stops may take the form of equi-spaced rods supported from the casing 8 and loosely engaging in corresponding holes in the flange 4. In this bellows arrangement, the bellows permits slight relative deflection between the journal member and the journal bearing member, so that the annular sealing part need not necessarily be flexible.

Similarly the ring 3 may be replaced by a flexible annular diaphragm sealed to the casing 8 and to the flange 4, rotary stops again being provided.

Other forms of the invention are shown in FIGS. 3 and 4. In FIG. 3, a gas lubricated journal bearing assembly comprises a journal member in the form of a rotatable shaft 31 and a journal bearing member in the form of a sleeve 32 round the shaft 31. The sleeve 32 has a flange 33 to which one end of a bellows 34 is sealed, the other end of the bellows 34 being sealed to a casing 35. The shaft 31 projects through the casing 35 and forms a base part to which a coaxial sleeve part 36 is joined by an annular sealing part in the form of rubber sealing rings 37 of rectangular section between the shaft 31 and the sleeve part 36. The rings 37 are located at each end of the sleeve part 36 in grooves 38 in the shaft 31. Rotary stops are provided in the form of equi-spaced pegs (one of which is shown and designated 39) on the flange 33 which loosely engage in housings (one of which is shown and designated 40) supported from the casing 35. The size and surface finish of the sleeve 32 and the sleeve part 36 are such as to maintain gas lubrication, e.g. the diametral clearance is 0.001 inch for a diameter of two inches.

In operation of the assembly shown in FIG. 3, a gas lubricating film is generated between the sleeve part 36 and the sleeve 32 by relative rotation between them when the shaft 31 is rotated, the gas source being ambient gas at a pressure higher than that in the casing 35 so that gas in the casing 35 cannot escape through the sleeve 32. The bellows 34 permits slight relative deflection between the shaft 31 and the sleeve 32. Should gas lubrication fail, resulting in the sleeve 32 and the sleeve part 36 seizing together, a small rotary deflection is applied to the bellows 34 to bring the pegs 39 against the walls of the housings 40, and then relative rotation between the shaft 31 and the sleeve part 36 takes place by slip at the rings 37, the bellows 34 thereby being strengthened against torque causing its rupture, which would otherwise create a large leakage path.

FIG. 4 shows a totally enclosed compressor having a rotatable hollow shaft 51 supported in four gas lubricated journal bearing assemblies 52 arranged in line in a casing 53.

Each assembly 52 has a journal member in the form of the shaft 51 and a journal bearing member in the form of a sleeve 54 round the shaft 51. Each sleeve 54 is supported from the casing 53 by a flexible annular diaphragm 55 sealed to a flange 56 on the casing 53 and a flange 57 on the sleeve 54. Each sleeve 54 forms a base part to which a coaxial sleeve part 58 is joined by an annular sealing part in the form of rubber sealing rings 59 of circular section between the sleeve 54 and the sleeve part 58. The rings 59 are located at each end of the sleeve part 58 in grooves 60 in the sleeves 54. Rotary stops are provided for each assembly 52, the stops being in the form of equi-spaced studs (one of which is shown and designated 61) on the sleeve 54, each stud 61 having a corresponding stop plate 62 spaced slightly in advance (rotationally) from that stud and supported from the casing 53. The shaft 51 has an electrical rotor 63 having a stator and windings 64 supported from the casing 53. The shaft 51 carries a peripheral type impeller 65. The size and surface finish of the shaft 51 and the sleeve parts 58 is such as to maintain gas lubrication, e.g. the diametral clearance is 0.001 inch for an O.D. of the shaft 51 of two inches.

In operation of the compressor, a gas lubricating film is generated between the shaft 51 and each sleeve part 58 by rotation of the shaft 51, the gas course being ambient gas in the casing 53. The diaphragms 55 permit slight relative deflection between the shaft 51 and the sleeves 54. Should gas lubrication fail, resulting in the shaft 51 and the sleeve parts 58 seizing together, a small rotary deflection is applied to the diaphragms 55 to bring the studs 61 against the stop plates 62, and then relative rotation between the sleeve parts 58 and the sleeves 54 takes place by slip at the rings 59, the diaphragms 55 thereby being strengthened against torque causing their rupture.

I claim:

1. A journal bearing assembly comprising a rotatable shaft member, journal bearing means including inner and outer sleeve members mounted coaxially about the shaft member, the inner sleeve member being engaged for relative sliding rotation with one of said shaft and outer sleeve members, means for supplying lubricating gas to the interface between said inner sleeve member and said one of the shaft and outer sleeve members, and an annular resilient sealing member engaged between the inner sleeve member and the other of said shaft and outer sleeve members for slippage when there is a failure in the gas supply to said interface.

2. A journal bearing assembly according to claim 1 wherein said annular resilient member is engaged between the second sleeve member and the shaft.

3. A journal bearing assembly according to claim 2 wherein the shaft has a circumferential groove in which the resilient member is engaged.

4. A journal bearing assembly according to claim 1 wherein said journal bearing means also includes casing means and means for limiting rotational movement of the first sleeve member relative to the casing means.

References Cited in the file of this patent

UNITED STATES PATENTS

| | | |
|---|---|---|
| 2,054,228 | Oelkers et al. | Sept. 5, 1936 |
| 2,620,243 | Beatty | Dec. 2, 1952 |
| 2,623,353 | Gerard | Dec. 30, 1956 |